United States Patent [19]

Hedström

[11] Patent Number: 5,003,483
[45] Date of Patent: Mar. 26, 1991

[54] METHOD AND APPARATUS FOR CONTROLLING THE SPEED OF A MOTOR VEHICLE

[75] Inventor: Lars-Gunnar Hedström, Vagnhärad, Sweden

[73] Assignee: Saab-Scania Aktiebolag, Sweden

[21] Appl. No.: 327,897

[22] Filed: Mar. 23, 1989

[30] Foreign Application Priority Data

Mar. 31, 1988 [SE]  Sweden ............................... 8801201

[51] Int. Cl.⁵ .............................................. B60K 41/20
[52] U.S. Cl. .............................. 364/426.04; 192/1.23; 192/1.21; 180/179
[58] Field of Search ........................ 364/426.04, 426.05, 364/424.1, 431.07, 565; 180/170, 179; 192/1.21, 1.23, 1.51, 4 B, 0.09, 9

[56] References Cited

U.S. PATENT DOCUMENTS

| | | | |
|---|---|---|---|
| 2,538,796 | 1/1951 | Oetzel et al. ........................ | 192/1.23 |
| 3,033,053 | 5/1962 | Kelley ................................. | 192/1.23 |
| 3,108,667 | 10/1963 | Kelley ................................. | 192/1.23 |
| 3,407,908 | 10/1968 | Smith .................................. | 192/1.51 |
| 4,262,783 | 4/1981 | Scarrott et al. ...................... | 192/0.09 |
| 4,401,075 | 8/1983 | O'Keefe, Jr. et al. ........... | 364/426.04 |
| 4,419,729 | 12/1983 | Krieder ........................... | 364/426.04 |
| 4,462,479 | 7/1984 | Steel .................................... | 180/171 |
| 4,467,428 | 8/1984 | Caldwell ............................. | 364/426 |
| 4,477,124 | 10/1984 | Watanaloe .......................... | 303/100 |
| 4,485,444 | 11/1984 | Maruyama et al. ............. | 364/426.04 |
| 4,566,067 | 1/1986 | Sahasrabudhe et al. ....... | 364/426.05 |
| 4,598,370 | 7/1986 | Nakajima et al. .............. | 364/426.04 |
| 4,618,040 | 10/1986 | Honma et al. ..................... | 192/0.09 |
| 4,867,288 | 9/1989 | Simonyi et al. .................... | 192/1.23 |

Primary Examiner—Thomas G. Black
Attorney, Agent, or Firm—Ostrolenk, Faber, Gerb & Soffen

[57] ABSTRACT

A method and apparatus for controlling the speed of a motor vehicle in which a target speed is established and lowered upon each actuation of a driver-actuated brake. If the actual vehicle's speed exceeds the target speed, an auxiliary braking system is actuated to lower the actual vehicle speed to the target speed. If the vehicle's accelerator is thereafter actuated, the auxiliary braking system is disabled until the driver-actuated brake is again actuated.

10 Claims, 1 Drawing Sheet

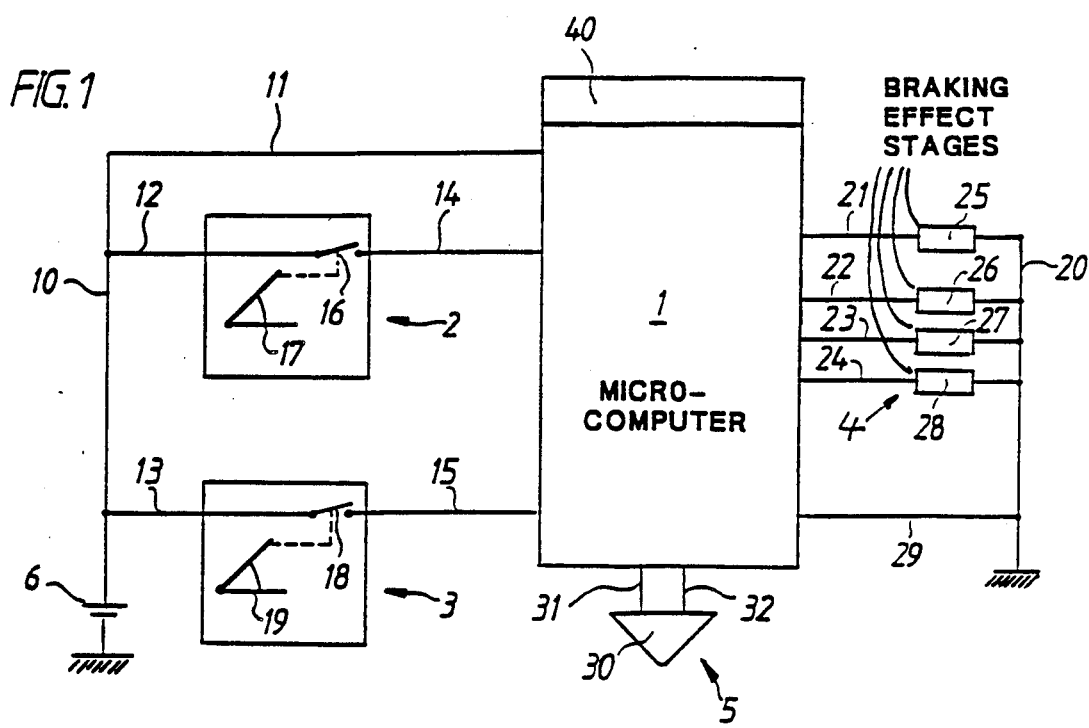
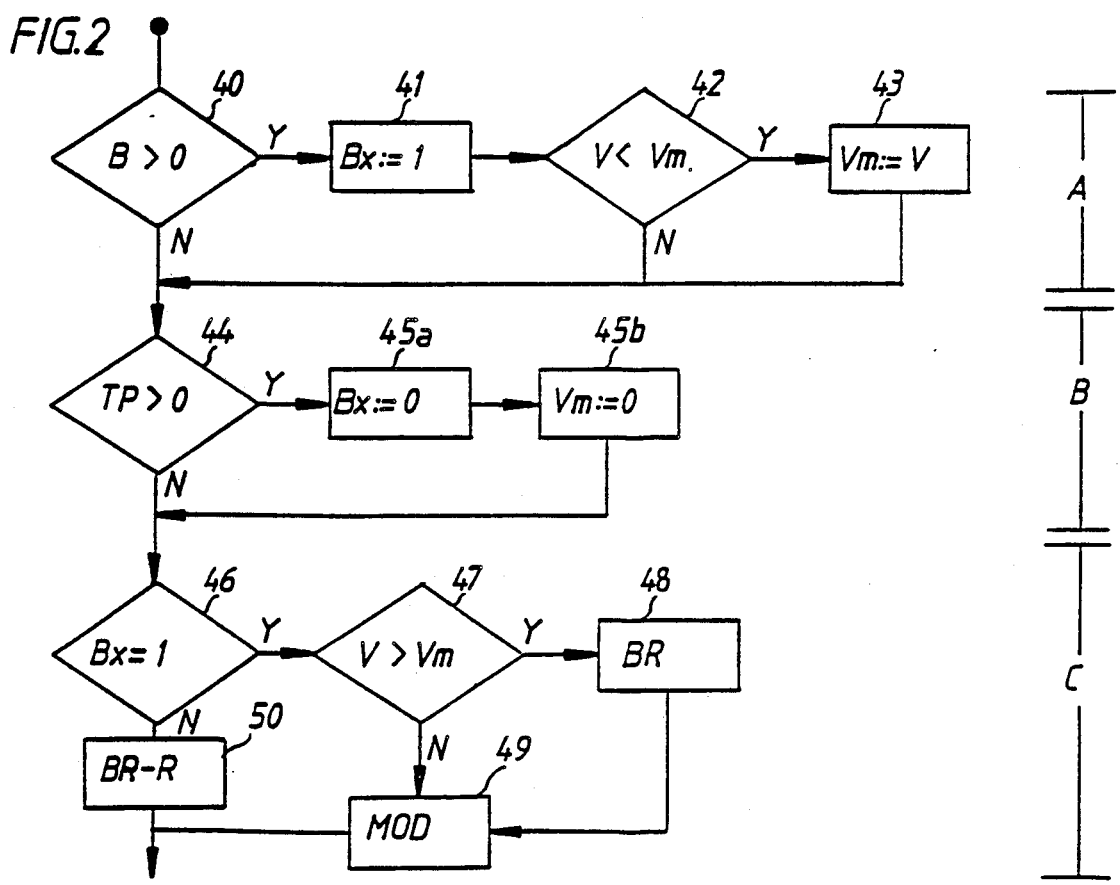

METHOD AND APPARATUS FOR CONTROLLING THE SPEED OF A MOTOR VEHICLE

The invention relates to a method and apparatus for controlling the speed of a motor-vehicle when travelling on downhill slopes.

BACKGROUND OF THE INVENTION

In order to be able to achieve constant speedkeeping for a motor-vehicle on downhill slopes, regulation of the vehicle's brakes towards a target speed selected by the driver is already known.

In the case of heavier motor-vehicles, there are used in this connection various types of auxiliary brakes over and above the vehicle's ordinary wheel brakes. These auxiliary brakes can be designed in such cases with a forced cooling system which allows for prolonged application of the auxiliary brakes without the vehicle's main brakes being used. As a result, the main brakes, which conventionally comprise friction brakes of the disc brake or drum brake type, are prevented from overheating, with the associated risk of brake failure. With the use of auxiliary brakes, increased operating safety is thus obtained in the braking system, since the auxiliary brakes are advantageously used for constant speedkeeping purposes and for moderate decelerations, whilst the vehicle's main brakes are saved for violent brakings provoked by unexpected disturbances in the traffic flow.

Sytems for constant speedkeeping on downhill slopes by the regulation of auxiliary brakes are previously known through, for example, patent specifications U.S. Pat. Nos. 4,485,444 4,477,124 and 4,462,479, in which systems built up of logic circuits, for example in the form of a microcomputer, regulate the brakes towards a target speed set by the driver.

The known constant speedkeeping systems are actuated by a driver-activatable control system which is used exclusively for this purpose. This control system can, for example, be disposed upon the steering wheel console in the form of a lever or a rotary control or, in certain cases, a foot-operated control over and above the vehicle's ordinary foot pedals for acceleratoar, brakes and clutch. Constant speedkeeping systems have also been proposed, actuated through some forms of push-bottom programming by the driver.

SUMMARY OF THE INVENTION

The object of the present invention is to allow an automatic constant speedkeeping function on downhill slopes which will take effect once the driver has actuated an ordinary service brake control for the main braking system of the vehicle. It is thus possible to omit an extra operating control system for the driver which would be exclusively operated for actuation of the constant speedkeeping function and which, additionally, would increase the number of driver controls and the complexity of the driver's enviroment. To this end, the method and apparatus of the invention includes the steps of, or means for, actuating a driver actuated brake to establish a target speed and, if desired, lowering the target speed by reactuation of the driver-actuated brake. The actual speed of the vehicle is measured and compared with the target speed. If the actual vehicle speed is greater, an auxiliary braking system is actuated to lower the vehicle speed to the target speed. If the accelerator is thereafter actuated, the auxiliary braking system is disabled until the driver-actuated brake is again actuated.

In an embodiment of the process according to the invention, the disengagement of the constant speedkeeping systen is actuated in a manner known per se by an ordinary control for regulation of the motor-vehicle's load. Consequently, a constant speedkeeping function is obtained totally without either extra actuation or extra deactuation controls.

In a further advantageous embodiment, the downward regulation of the constant speedkeeping function towards a target value is principally effected by the fact that the vehicle's auxiliary brakes are activated while the vehicle's ordinary wheel brakes are not actuated or, alternatively, are partly actuated by an ordinary service brake control partially activated by the driver.

Other distinguishing features will emerge from the appended claims and from the subsequent description made with reference to the attached figures.

BRIEF DESCRIPTION OF THE FIGURES

FIG. 1 shows a basic structural design of a braking-system according to the invention.

FIG. 2 shows a flow-chart relating to the brake actuation program.

DESCRIPTION OF AN EXAMPLARY EMBODIMENT

FIG. 1 illustrates a basic arrangament incorporating those components necessary for the invention. Other monitoring devices or regulating devices which form part of a complete braking system for motor-vehicles, but which are not necessary for an understanding of the invention, are omitted.

The braking system incorporates a logic circuit which, in the exemplary embodiment, comprises a microcomputer 1, hereinafter referred to as the CPU. The system receives a power supply from a battery 6 via a feed cable 10, to which are connected cables 11, 12, 13. These are in turn connected respectively to the CPU, a brake pedal transmitter 2 and an accelerator pedal 3. The CPU is grounded via cable 29. The transmitters 2, 3 consist of limit contacts 16, 18 which are connected to each foot pedal control and which are only open when the foot pedal controls 17, 19 respectively are at rest. Consequently, as a result of these contacts, the CPU receives signals via cable 14, 15 whenever the accelerator pedal or brake pedal is activated.

The CPU continuously monitors the vehicle's speed through a speed transmitter 5. The speed transmitter is suitably a frequency transmitter 30 of the inductive type, connected to the CPU via clabes 31, 32, and which, through rotating gear rings or hollow rings on, for example, an output shaft in the vehicle's gearbox, transmits an alternating voltage, the frequency of which is proportional to the speed. The CPU is also able, through changes in the frequency, to calculate the vehicle's rate of acceleration.

Depending upon the incoming signals from the brake pedal transmitter 2, the accelerator pedal transmitter 3 and the speed transmitter 5, the CPU then actuates the brake regulating device 4.

According to the invention, the CPU contains a memory unit 40 within which the CPU stores a value representing the vehicle's lowest instantaneous speed, monitored by the speed transmitter 5 during the time in which the brake pedal 17 is activated and the contact 16 is closed. Following activation of the brake pedal, the CPU uses the speed value stored within the memory 40 as a speedkeeping target value. In the preferred embodiment, the target value is stored in a register address within the CPU intended for the target value and the conditions for the target value monitoring and fresh inputting of a new target value are provided by the CPU's software. The same functions can also of course be obtained with a control unit built up from logic circuits. By means of the abovementioned arrangement, there is thus formed a constant speedkeeping target value which, in a manner later described, is used for regulation of the vehicle's braking device 4 whenever the vehicle speed exceeds the traget value.

The CPU also contains at least one resetting device which, in the exemplary embodiment, comprises the accelerator pedal transmitter 3. This device, upon being activated, transmits a signal through cable 15, whereupon the CPU suspends the constant speedkeeping function. This can suitably occur as a result of the target value within the CPU register being allocated an unreasonably high value substantially in excess of the vehicle's maximum speed, which means that the vehicle's monitored speed cannot exceed this fictitious target value. When the system, following actuation of the the brakes, has once again received a real target value stored within the memory, the braking device will be applied as soon as the vehicle's speed exceeds the target value, whereas the constant speedkeeping function ceases once the accelerator pedal is re-actuated.

The flow digram in FIG. 2 illustrates how the constant speedkeeping functions is obtained according to a program stored within the CPU. The program is divided into 3 main sections, A, B, C. The first section A produces a function in which any actuation of the brakes is monitored and a target value Vm is set at the vehicle's lowest speed. In a comparison stage 40, monitoring is carried out to determine whether the brake pedal 17 is actuated, which a signal B on the cable 14 transmits. If a signal is present on the cable 14, then the program proceeds to the operation stage 41, in which a brake flag Bx within the CPU register is set high, whereupon the program proceeds to a comparison stage 42, in which the vehicle's speed V is compared with the target value Vm within the CPU register. If the vehicle speed V lower than the target value Vm, the program goes on to the operation stage 43, in which the vehicle speed V is inputted as a new target value Vm.

There then follows the second section B of the program, in which a resetting function is obtained if the accelerator is actuated. In the comparison stage 44, monitoring is carried out to determine whether the accelerator pedal 19 is actuated, which a signal TP on the cable 15 transmits. If a signal is present on the cable 15, then the program proceeds to the operation stage 45a, in which the brake flag Bx within the CPU register is set low, whereupon the program proceeds to the operation stage 45b, in which the target value Vm is allocated the abovementioned unreasonably high value for the vehicle.

After the program sections A and B there follows the brake control function C itself, for obtained constant speedkeeping on downhill slopes. This function is only actuated however if the brake flag Bx is high, which is the case if the brake pedal has been actuated without accompanying or simultaneous actuation of the accelerator pedal. Program section C commences in the comparison stage 46, in which monitoring of the status of the brake flag bx is carried out. If the brake flag Bx is high, the program proceeds to the comparison stage 47, in which the vehicle's speed is compared against the target value Vm obtained from function A. If the vehicle speed V is greater than the target value Vm, the program then proceeds to the operation stage 48, the vehicle's braking device 4 is applied, designated in the figure as BR, after which the program goes on to the operation stage 49. The program also goes to this stage if, in stage 47, the vehicle speed V was found to be less than the target value Vm. Stage 49 contains a control routine MOD, in which both vehicle's deceleration and acceleration are checked whenever a braking procedure is initiated. For smooth brake control, the brake application level can be adjusted downwards if the deceleration exceeds defined limit values and can be adjusted upwards if the acceleration exceeds other defined limit values.

Stage 48 can itself contain a number of sub-elements, in which the brake application level within the vehicle's braking device 4 is regulated in proportion to the exceeded target value. The braking device 4 can advantageously comprise an auxiliary brake in the vehicle's drive line, i.e. in the power transmission between engine and drive gear, in the form of a hydrodynamic retarder or an electrical eddy current brake. These can be primarily regulated in a plurality of braking stages, after which, in the case of major braking requirements, a conventional exhaust brake connected to the engine can also be actuated. The exemplary embodiment in FIG. 1 shows an arrangement with an exhaust-gas actuator 25 and a retarder with three braking effect stages 26-28. The first braking effect stage 26 yields a braking torque which has been tailored to the vehicle and to low braking requirements, whereas braking stages 27 and 28 yield progressively increasing braking torques. With a braking device set-up of this kind, the CPU can then regulate the braking effect stage 26 in the event of the speedkeeping target value being moderately exceeded, whereas stages 27-28, plus 25, are regulated in proportion to the degree by which the target value Vm is exceeded.

If program secton C in stage 46 detects that the brake flag Bx is low, which is the case where the accelerator pedal has been actuated without subsequent brake pedal actuation, the program then proceeds to stage 50. This disengages the brakes, designated in the figure as BR-R, which the program might have actuated in program stage 48 upon prior running of the control program.

The program 40-49/50 is suitable run by the CPU as an interrupt routine a number of times per second. Each stage takes something in the order of a few microseconds in terms of running time, Since the formation of a new speed value V for the vehicle through the frequency transmitter 30 calls for a certain minimun time, it is this time which determines the system's response time for brake regulation. On the other hand, the brake regulation is suspended through an accelerator pedal starting rheostat with a response time corresponding to the interrupt interval. The vehicle's inertia is so great, however, that the brake regulation by the driver will be felt to be continuous.

The above description of an exemplary embodiment of the invention should not be regarded as limiting the same, but rather, within the framework of the concept of the invention and the attached Patent Claims, it can be modified in plurality of embodiments.

I claim:

1. A method of controlling the speed of a motor vehicle, the vehicle having a driver-actuated brake and an auxiliary braking system, which method comprises the steps of:
   (a) actuating the driver-actuated brake to brake the vehicle and establish a target speed;
   (b) reactuating the driver-actuated brake each time it is desired to lower the target speed;
   (c) measuring the vehicle speed;
   (d) comparing the speed of the vehicle with the target speed; and
   (e) braking the vehicle by actuation of the auxiliary braking system if the measured vehicle speed is greater than the target speed.

2. A method according to claim 1, wherein the vehicle includes a driver-actuated accelerator and further including:
   performing step (e) only if the driver actuated accelerator has not been actuated, unless subsequent to actuation of the accelerator the driver-actuated brake is actuated.

3. A method according to claim 1, wherein the target speed is the lowest intantaneous speed developed during actuation of the driver-actuated brake.

4. Apparatus for controlling the speed of a motor vehicle having a driver-actuated brake, which comprises:
   (a) means reponsive to actuation of the driver-actuated brake for establishing a target speed for the vehicle;
   (b) means for measuring the actual vehicle speed;
   (c) means for comparing the measured speed to the target speed;
   (d) an auxiliary braking system for braking the vehicle; and
   (e) means reponsive to the comparing means for actuating the auxiliary braking system if the measured speed is greater than the target speed.

5. Apparatus according to claim 4, wherein the vehicle includes a driver-actuated accelerator and further including means responsive to actuation of the accelerator for disabling the auxiliary braking means and responsive to the driver-actuated brake for re-enabling the auxiliary braking system upon actuation of the driver-actuated brake subsequent to actuation of the accelerator.

6. Apparatus according to claim 5, wherein the auxiliary brake comprises a hydrodynamic brake disposed within the vehicle's drive line.

7. Apparatus according to claim 5, wherein the auxiliary brake comprises an eddy current brake disposed within the vehicle's drive line.

8. Apparatus according to claim 5, wherein the auxiliary brake comprises a friction brake disposed within the vehicle's drive line.

9. Apparatus according to claim 5, wherein the auxiliary brake system further comprises an exhaust brake disposed within an exhaust system of the vehicle, and the means for controlling the vehicle's braking includes means to regulate the exhaust brake to effect braking whenever the first-mentioned brake is unable to reduce the vehicle's speed down to the speed-keeping target value.

10. Apparatus according to claim 4, wherein the means for establishing a target speed establishing a target speed which is the lowest instantaneous speed developed during actuation of the driver-actuated brake.

* * * * *